United States Patent [19]

Tucker

[11] Patent Number: 4,500,684
[45] Date of Patent: Feb. 19, 1985

[54] HYDROPHOSPHONYLATED DERIVATIVES OF GLYCIDYL ETHER POLYMERS

[75] Inventor: Harold A. Tucker, Shaker Heights, Ohio

[73] Assignee: The B. F. Goodrich Company, Akron, Ohio

[21] Appl. No.: 567,287

[22] Filed: Dec. 30, 1983

[51] Int. Cl.³ .............................. C08F 8/42
[52] U.S. Cl. .................... 525/327.3; 525/340; 528/343; 528/398
[58] Field of Search ............ 525/327.3; 528/343, 528/398

[56] References Cited

U.S. PATENT DOCUMENTS

| | | | |
|---|---|---|---|
| 2,627,521 | 2/1953 | Coover, Jr. | 528/398 |
| 2,849,418 | 8/1958 | Fang | 525/327.3 |
| 3,096,315 | 7/1963 | Tinsley et al. | 525/327.3 |
| 3,654,189 | 4/1972 | Venezky | 528/398 |
| 3,660,314 | 5/1972 | Vandenberg | 528/398 |
| 3,799,947 | 3/1974 | Gurgiolo et al. | 528/393 |
| 4,425,451 | 1/1984 | Sekmakus et al. | 528/398 |

Primary Examiner—Joseph L. Schofer
Assistant Examiner—Bernard Lipman
Attorney, Agent, or Firm—Carl W. Battle; Alan A. Csontos

[57] ABSTRACT

Hydrophosphonylated derivatives of homopolymers and copolymers of poly allyl glycidyl ethers are formed by reacting said polymers with sodium hypophosphite ($NaH_2PO_2$). The novel polymers of this invention may be represented by the general formula:

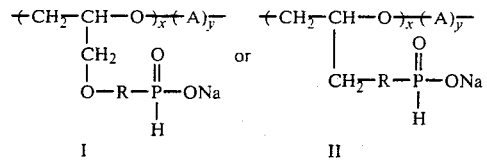

wherein x ranges from about 5 to about $10^6$, y ranges from 0 to about $10^6$, A is interpolymerized units of one or more epoxides having the oxirane group

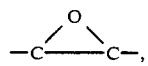

and R is

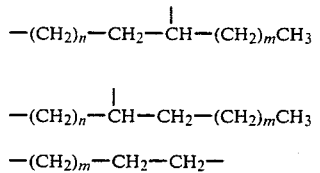

$-(CH_2)_m-CH_2-CH_2-$ $-(CH_2)_m-\overset{|}{CH}-CH_3$ n is 0 to 19, and m is 0 to 20. y Preferably is zero, and x preferably ranges from about 5 to about $10^6$, and most preferably from 5 to 10.

6 Claims, No Drawings

HYDROPHOSPHONYLATED DERIVATIVES OF GLYCIDYL ETHER POLYMERS

BACKGROUND OF THE INVENTION

Amphophilic cationic polymers are useful as general polymeric surfactants. These cationic polymers find applications as water treatment chemicals, membranes, pigment dispersants, coupling agents, and antistats. Anionic amphophilic polymers can be used to complement or replace the cationics in these applications.

In accordance with this invention, the hydrophosphonylation of allyl glycidyl ether polymers with sodium hypophosphite is a successful route to making a novel class of anionic polymers. The chemistry involved in this reaction is the addition of sodium hypophosphite to an olefin to give a sodium alkyl phosphonite. This reaction is general for phosphorous compounds containing a P—H bond.

The reaction of sodium hypophosphite to a monomeric olefin to give a sodium alkyl phosphonite is known in the art and described in *Organic Reactions*, Vol. 13, F. W. Stacey, and J. F. Harris, p 218 (1963). A description of the addition of sodium hypophosphite to octene-1 is given in British Pat. No. 660,918. USSR Pat. No. 596,593 describes the hydrophosphonylation of allyl cellulose polymers, however, water soluble allyl glycidyl ether polymers are not among those described. The polymers disclosed in the USSR Pat. No. 596,593 are described as being water resistant; ergo water insoluble. The optimization of the reaction of sodium hypophosphite with octene-1 is discussed by C. Herranz Augustin, *Tenside Detergents*, Volume 18, pages 190–193 (1981).

The prior art does not disclose high molecular weight hydrophosphonylated polymers which exhibit good water solubility and dispersant properties. It is the object of the present invention to prepare hydrophosphonylated glycidyl ether polymers and copolymers which are water soluble and which are effective aqueous dispersing agents. It is known that polymeric suspending agents are more efficient than the monomeric types. The polymeric materials are also more effective as thickeners, and are resistant to solvent extraction when used as stabilizers in polymer formulations.

The technical literature lists many applications for hypophosphorous acid, sodium hypophosphite, and their derivatives. These references provided good indications of the utility of hydrophosphonylated polymers. For example, a major use of sodium hypophosphite is for the electroless deposition of nickel as disclosed in *Kirk-Othmer Encyclopedia of Chemical Technology*, 3rd Edition, Volume 10, p. 249. Sodium hypophosphite derivatives are disclosed as dispersing agents and antifouling agents in vinyl chloride polymerization in U.S. Pat. No. 3,026,308 and Ger. Offen. No. 2,611,385. References also disclose the usefulness of phosphonites as polyvinyl chloride (PVC) stabilizers (see for example, U.S. Pat. No. 3,050,499). This would give the hydrophosphonylated polymers of this invention utility as stabilizers for PVC.

Hydrophosphonylated polymers are highly hygroscopic. This property makes them suitable for use as anti-static agents. For some applications, the use of hydrophosphonylated polymers have distinct advantages over the commonly used cationics, such as the cationic quaternary ammonium salts. Unlike the quaternary ammonium salts, the hydrophosphonylated polymers are colorless and do not break down to colored or basic amine compounds. This makes the hydrophosphonylated polymers particularly useful as antistats in polyvinyl chloride resins.

DETAILED DESCRIPTION

This invention relates to a novel class of hydrophosphonylated derivatives of glycidyl ether polymers. The novel compounds of this invention can be made through the reaction of sodium hypophosphite ($NaH_2PO_2$) with homopolymers or copolymers of poly allyl glycidyl ethers, and in the presence of free radical initiators such as organic azo compounds or peroxides.

Polymeric glycidyl ethers which are useful for the practice of this invention are commonly prepared by the homopolymerization of allyl glycidyl ether monomers. The unsaturated epoxi-ethers that may be polymerized have the general formula

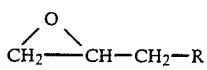

where R represents $-(CH_2)_n-CH=CH-(CH_2)_mCH_3$, $-(CH_2)_m-CH=CH_2$, $-O-(CH_2)_n-CH=CH-(CH_2)_mCH_3$, or $-O-(CH_2)_mCH=CH_2$;

n is 0 to 19; and m is 0 to 20. The glycidyl ethers may be copolymerized with other epoxides having the oxirane group

such as, for example, ethylene oxide, propylene oxide, and epichlorohydrin. Preparation of polymeric epoxides, homopolymers and copolymers can be by any method known in the art, such as described in U.S. Pat. Nos. 3,135,705; 3,158,581; and 3,158,591 the disclosures of which are herein incorporated by reference.

The novel polymers of this invention may be represented by the general formula:

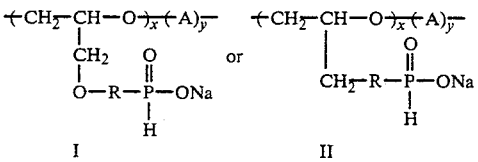

wherein x ranges from about 5 to about $10^6$, y ranges from 0 to about $10^6$, A is interpolymerized units of one or more epoxides having the oxirane group

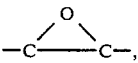

and R is

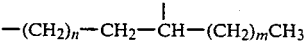

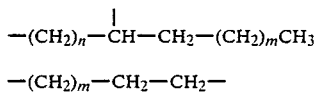

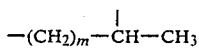

$-(CH_2)_m-\overset{|}{CH}-CH_3$ n is 0 to 19, and m is 0 to 20. y preferably is zero, and x preferably ranges from about 5 to about $10^6$, and most preferably from 5 to 10. The polymeric backbone may be a homopolymer of poly allyl glycidyl ether or a copolymer of poly allyl glycidyl ether with other poly epoxides.

The anionic functions of the novel polymers of the present invention are introduced through reaction with sodium hypophosphite. The reaction of the unsaturated polyethers with sodium hypophosphite is carried out in the presence of free radical initiators such as organic azo compounds or peroxides. The reaction is preferably carried out utilizing an organic azo catalyst having the azo group —N=N—, such as, for example, azoisobutyryl nitrile. The azo catalyst produces a more selective radical and prevents undesirable crosslinking of the polymer. This results in a polymer which has good water solubility.

The reaction of sodium hypophosphite ($NaH_2PO_2$) with a typical poly allyl glycidyl ether homopolymer may generally be represented as follows:

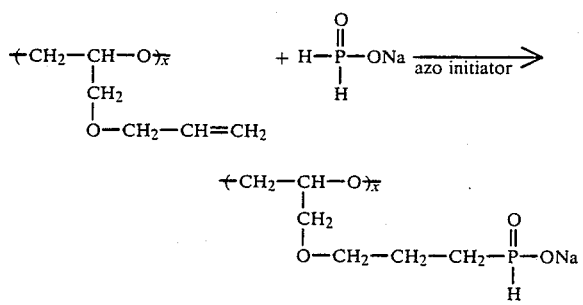

where x preferably is $5-10^6$, and most preferably x is 5-10. The reaction may be carried out in a suitable solvent which is not subject to attack by free radicals. When utilizing high molecular weight polymers with high viscosities, a suitable solvent is desirable for improved handling. Suitable organic solvents are those such as methanol, t-butanol, benzene, and chloro-benzene.

The following examples are illustrative of the present invention and are not to be regarded in a limitative sense.

EXAMPLE I

In this example sodium hypophosphite was reacted with poly(allyl glycidyl ether)homopolymer having 5 repeating units in the presence of azoisobutyryl nitrile (AIBN) catalyst and methanol solvent. The recipe in Table I was used in carrying out the synthesis in this example.

TABLE I

| Ingredient | Amount |
| --- | --- |
| Poly(AGE)$_5$ | 11.4 grams |
| NaH$_2$PO$_2$ | 10.6 grams |

TABLE I-continued

| Ingredient | Amount |
| --- | --- |
| Methanol | 100 ml |
| AIBN | 0.8 grams |

(AGE = allyl glycidyl ether-$C_6H_{10}O_2$)

The above materials were charged to a 14 oz. crown capped glass bottle which had been purged with nitrogen. The bottle was capped and tumbled for approximately 8 hours at a temperature of about 75°–85° C. in a water bath. After about 8 hours in the water bath, the bottle was removed and allowed to stand at room temperature overnight. The solvent was evaporated and a white hygroscopic solid product remained. The final product was identified utilizing $P^{15}$ NMR analysis.

EXAMPLE II

This reaction was carried out following the procedure given in Example I above. The recipe given in Table II below was utilized for this synthesis.

TABLE II

| Ingredient | Amount |
| --- | --- |
| Poly(AGE)$_{10}$ | 11.4 grams |
| NaH$_2$PO$_2$ | 10.6 grams |
| Methanol | 100 ml |
| AIBN | 0.8 grams |

EXAMPLE III

This reaction was carried out following the procedure given in Example I. The polymeric reactant used in this example was a block copolymer of poly(allyl glycidyl ether) and poly(epichlorohydrin). The recipe given in Table III below was utilized for this synthesis.

TABLE III

| Ingredient | Amount |
| --- | --- |
| Poly(AGE)$_5$-(ECH)$_5$ | 20.7 grams |
| NaH$_2$PO$_2$ | 10.6 grams |
| Methanol | 100 ml |
| AIBN | 0.8 grams |

(ECH = epichlorohydrin)

EXAMPLE IV

This reaction was carried out following the procedure given in Example I. The polymeric reactant used in this example was a block copolymer of poly(allyl glycidyl ether) and poly(tetrahydrofuran). The recipe given in Table IV below was utilized for this synthesis.

TABLE IV

| Ingredient | Amount |
| --- | --- |
| Poly(AGE)$_{10}$-(THF)$_{14}$-(AGE)$_{10}$ | 16.4 grams |
| NaH$_2$PO$_2$ | 10.6 grams |
| Methanol | 100 ml |
| AIBN | 0.8 grams |

THF = tetrahydrofuran

EXAMPLE V

This reaction was carried out following the procedure given in Example I. The polymeric reactant used in this example was a block copolymer of poly(allyl glycidyl ether) and a $C_{18}$ alkyl ether. The recipe given in Table V below was utilized for this synthesis.

TABLE V

| Ingredients | Amount |
|---|---|
| Poly(AGE)$_{10}$-OC$_{18}$H$_{35}$ | 11.4 grams |
| NaH$_2$PO$_2$ | 10.6 grams |
| Methanol | 100 ml |
| AIBN | 0.8 grams |

Examples I-V yielded a water soluble polymer product. The specific behavior of the respective hydrophosphonylated polymers in water is given in Table VI below.

TABLE VI

| Example | Behavior in Water |
|---|---|
| I | Clear, colorless solution |
| II | Very slightly cloudy, colorless solution |
| III | Bluish cloudy colloidal solution. Colloid is very stable and does not settle upon standing |
| IV | Slightly cloudy stable colloidal solution |
| V | Clear solution |

EXAMPLE VI

In this Example sodium hypophosphite was reacted wiith 1,4-polybutadiene following the procedure given in Example I. The reaction product was an oily residue which was neither soluble nor dispersible in water.

The interpretation of this result was that very little addition of the sodium hypophosphite had taken place. The Examples demonstrate the effectiveness of allyl glycidyl ether units in the polymeric backbone in achieving a water soluble product.

The polymers prepared in Examples I and II were evaluated as dispersing agents for hard Kaolin clay pigment in an aqueous slurry. The commonly accepted surfactant demand test was utilized for this evaluation, where small increments of the polymeric dispersant were added to the aqueous pigment slurry.

A sharp drop in slurry viscosity resulted upon adding a small amount of the polymeric dispersants, indicating high effectiveness of the novel polymers as an aqueous dispersant for clay pigment.

I claim:

1. A water soluble hydrophosphonylated polymeric compound having the structure selected from the group consisting of:

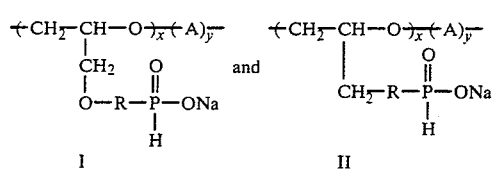

I                     II wherein x ranges from about 5 to about 10$^6$, y ranges from 0 to about 10$^6$, A is interpolymerized units of one or more epoxides having the oxirane group

and R is $$-(CH_2)_n-CH_2-\overset{|}{CH}-(CH_2)_mCH_3$$

$$-(CH_2)_n-\overset{|}{CH}-CH_2-(CH_2)_mCH_3$$

$$-(CH_2)_m-CH_2-CH_2-$$

$$-(CH_2)_m-\overset{|}{CH}-CH_3$$

n is 0 to 19, and m is 0 to 20.

2. A polymeric compound of claim 1 wherein said compound is prepared by reacting sodium hypophosphite with a homopolymer or copolymer of poly allyl glycidyl ether.

3. A polymeric compound of claim 1 wherein R is:

$$-CH_2-CH_2-CH_2-.$$

4. A water soluble hydrophosphonylated polymer compound having the structure selected from the group consisting of

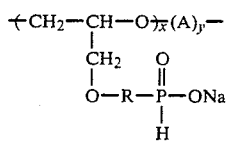

and

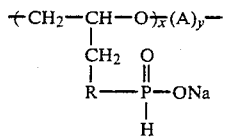

wherein x ranges from about 5 to about 34, y ranges from 0 to about 34, A is interpolymerized units of one or more epoxides having the oxirane group

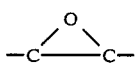

and R is $$-(CH_2)_n-CH_2-\overset{|}{CH}-(CH_2)_mCH_3$$

$$-(CH_2)_n-\overset{|}{CH}-CH_2-(CH_2)_mCH_3$$

$$-(CH_2)_m-CH_2-CH_2-$$

$$-(CH_2)_m-\overset{|}{CH}-CH_3-$$

n is 0 to 19, and m is 0 to 20.

5. A polymeric compound of claim 4 wherein x is 5 to 20 and y is 0 to 14.

6. A polymeric compound of claim 4 wherein x is 5 to 10 and y is zero.

* * * * *